Dec. 21, 1937. E. SCHWEITZER ET AL 2,103,224
APPARATUS FOR TESTING MAGNETIZABLE WORKPIECES
Filed May 22, 1935 3 Sheets-Sheet 1

Patented Dec. 21, 1937

2,103,224

UNITED STATES PATENT OFFICE 2,103,224

APPARATUS FOR TESTING MAGNETIZABLE WORKPIECES

Eugen Schweitzer, Wiesbaden-Biebrich, and Siegfried Kiesskalt, Frankfort-on-the-Main-Hochst, Germany, assignors to I. G. Farbenindustrie Aktiengesellschaft, Frankfort-on-the Main, Germany Application May 22, 1933, Serial No. 672,306
In Germany May 23, 1932

2 Claims. (Cl. 175—183)

The present invention relates to an apparatus for discovering inhomogeneities or defects in magnetizable workpieces, especially in welded seams.

According to our present invention we take advantage of the fact that the lines of magnetic force in a workpiece magnetized in a direction parallel to its surface which lines, as a rule, have a straight, undeflected course within the workpiece, undergo a change of direction owing to the inhomogeneous parts of the workpiece; consequently, at such defective parts the lines of magnetic force leave the workpiece.

It is already known to use these lines of magnetic force projecting from the surface of the workpieces at the defective parts for discovering the location of the inhomogeneity or defective part. According to this known method, the workpiece to be tested is magnetized by means of an electromagnet and an induction coil is placed on the surface of the workpiece. Whenever the current exciting the electromagnet is switched on and off, a current is induced in the coil if the coil is intersected by the lines of magnetic force projecting from the workpiece at the defective parts. (See W. Gerlach, "Metallwirtschaft", VIII, vol. 36, pages 875–877, September 1929.)

According to our present invention the known method is considerably simplified and made the basis of a useful industrial process for the continuous testing of magnetizable pieces. Our new process comprises continuously magnetizing the workpiece to be tested by means of permanent magnets or electromagnets or in another manner in a direction parallel with the surface and causing the coil to oscillate quickly.

For instance, a coil preferably of rectangular shape, with or without an iron core (see Fig. 3) is mounted on a tuning fork so that it oscillates at the same frequency as the tuning fork and in a direction parallel with the surface of the workpiece to be tested, when the tuning fork is struck, said workpiece being magnetized as described above. When the coil thus oscillating is passed over an inhomogeneous portion of the workpiece, inductive currents are produced in the coil because of the cutting of lines of magnetic force projecting from the workpiece at the said defective part by the coil. These inductive currents can be made perceptible in a suitable manner, for instance by conducting them over an amplifier to a telephone, a loudspeaker or an earphone in which audible sounds are thus produced as soon and as long as the oscillating coil is near the defective part of the workpiece being tested.

The principle of the invention thus described permits of various modifications as to the steps to be taken for causing the coil to oscillate and as regards the method of rendering perceptible the current induced in the coil when the latter is brought in proximity to the defective parts of the workpiece being tested.

Instead of connecting the coil with a tuning fork, as above mentioned, it can be placed on an oscillating metal spiral, for instance on the first or second internal turn of a helicoidal clock gong, so that the winding plane of the coil is parallel with the spiral plane of the gong.

The oscillations of the testing coil may also be produced by charging the exciting coil of a loudspeaker system directly with an alternating current. For this purpose there may be used the usual industrial alternating current of the supply net work. It is, however, also possible to produce the alternating current by using a tube apparatus such as the ultra-audion connection.

The whole apparatus is small, handy, and can readily be made in the form of a testing body with which joints or junctions in iron constructions can be approached.

We have succeeded in testing even large and thick parts of welded seams by means of our device. With it, it is possible to discover not only hollow places, but also those parts which have been welded with an excess of oxygen, that is, which have been slightly burnt. For instance two iron plates of 400 x 400 x 15 mm. were welded together at one of their edges so as to form a plane; the welded seam, therefore, had a length of 400 mm. 100 mm. thereof were welded as well as possible, 100 mm. with small hollow places, further 100 mm. with a small excess of oxygen and the remaining 100 mm. were again well welded. The two defective places could be directly discovered with a device according to the invention. Upon bringing the testing coil to the defective places, a sound became audible in the earphone, whereas no sound was heard when the testing coil was passed over the places of the welded seam which were free from defects, or over the surface of the two iron plates. The testing operation at the welded seam is not impeded by the magnets placed on the plate. The position of the magnets can be easily altered.

It is not necessary to retain the testing coil in the centre or in the middle plane of the magnets; only the area immediately surrounding the poleshoes has to be avoided. As the tests are not disturbed by elevations and recesses of the welded seam or of the object being tested, it is possible to carry out the testing operation without any mechanical treatment or destruction of the object to be tested.

The invention is further illustrated in the accompanying drawings in which.

Figure 1:
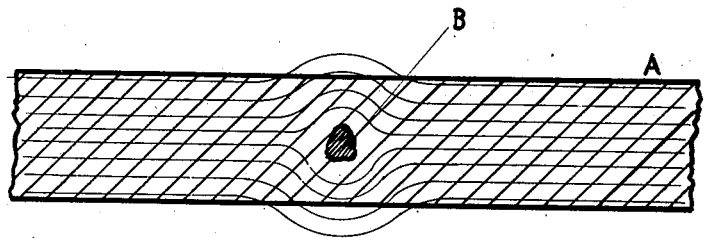
Fig. 1 is a cross section of a magnetized workpiece containing a defect, showing the magnetic lines of force.

In Fig. 1, A is a cross section of a magnetizable workpiece containing the defective part B at which the lines of magnetic force are deflected upwardly and downwardly, so that they project from the surface of the workpiece.

Figure 2:
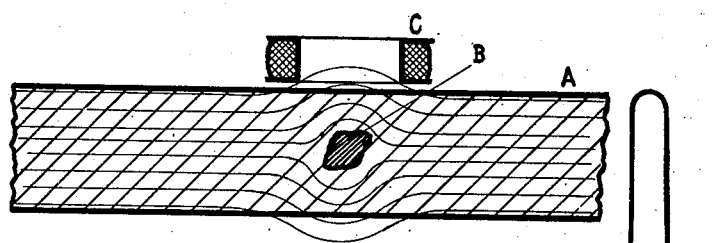
Fig. 2 shows a coil adjacent the workpiece of Fig. 1 for testing the workpiece according to the known process as described by W. Gerlach in "Metallwirtschaft", VIII, vol. 36, pages 875–877, Sept. 1929.

According to the method of Gerlach, referred to above, C, in Fig. 2, is the coil intersected by the lines of force deflected at the defect place B. By switching the magnetizing current on and off, an inductive current is produced in the coil C.

Figure 3:
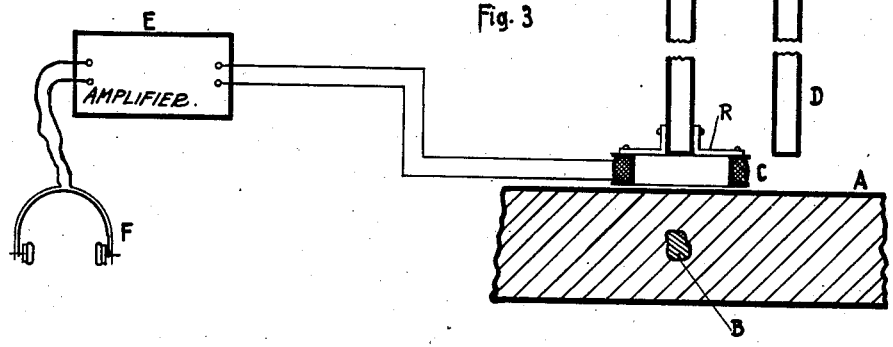
Fig. 3 is a diagrammatic illustration of an apparatus according to our invention.

In Fig. 3, coil C, preferably of rectangular shape, with or without an iron core, is mounted on a tuning fork D so that it oscillates with the same frequency as the tuning fork and in a direction parallel with the surface of the workpiece A to be tested, when the tuning fork is struck. The coil may be attached to the tuning fork in any suitable manner, one suitable form of connection being illustrated in the form of angle members R secured to the fork and coil. When the coil C thus oscillating is passed over an inhomogeneous or defective place B of the workpiece, inductive currents are produced in the coil C because of the cutting of lines of magnetic force projecting from the workpiece A at the said defective part by the oscillating coil C. These inductive currents can be made perceptible in a suitable manner, for instance by conducting them over an amplifier E to a telephone, a loudspeaker or an earphone F in which audible sounds are thus produced as soon and as long as the oscillating coil C is near the defective place B of the workpiece being tested.

Figure 4:
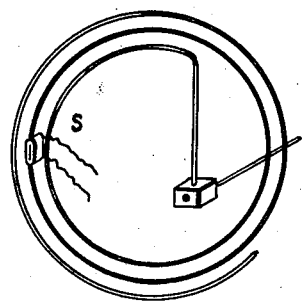
Fig. 4 illustrates a modification for supporting the coil for oscillating movement.

Instead of connecting the coil with a tuning fork, it can be placed on an oscillating metal spiral, for instance on the first or second internal turn of a helicoidal clock gong, as illustrated in Fig. 4, so that the winding plane of the coil is parallel with the spiral plane of the gong.

Figure 5:
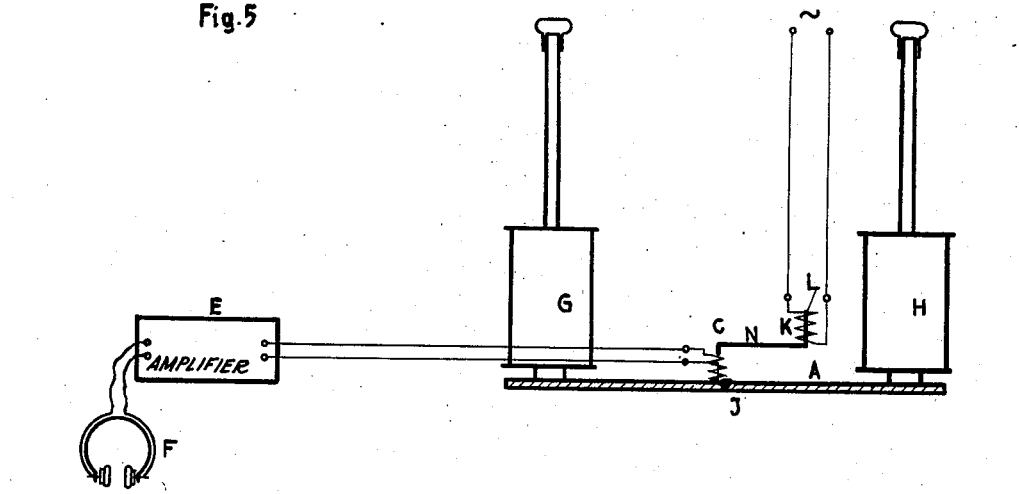
Fig. 5 illustrates an arrangement of the testing coil working with alternating current.

In the device shown in Fig. 5, A is a cross section of an iron piece containing the welded seam J. G and H are electromagnets placed on the iron piece at both sides of the welded seam. K is the loudspeaker coil charged with alternating current and containing in its interior the core L which is caused to oscillate by the alternating current. The oscillations of this core are transmitted to the testing coil C through the arm N which is made of a non-magnetizable material. If the oscillating testing coil C is brought to an inhomogeneous part of the welded seam J, inductive currents are produced therein which are amplified by the amplifier E and rendered audible in the earphone F.

Figures 6, 7:
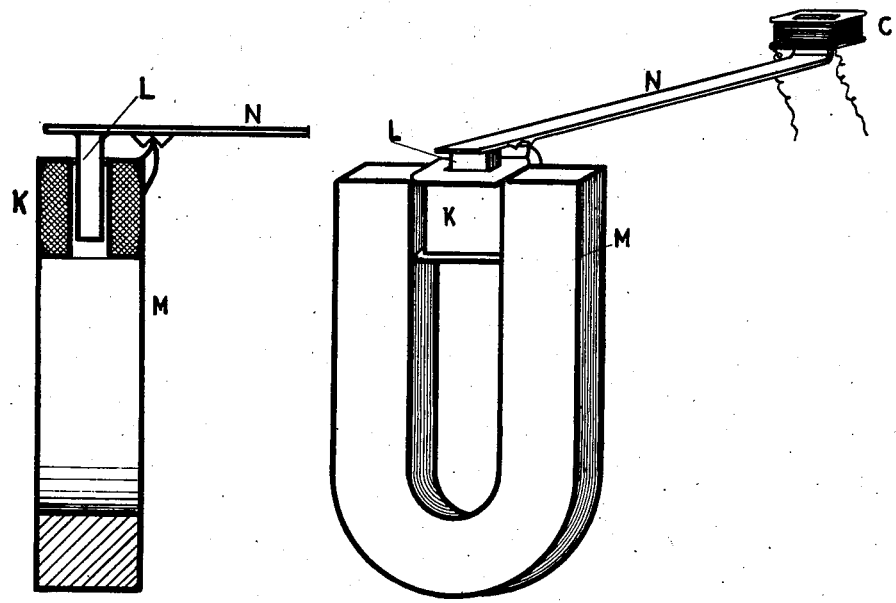
Figs. 6 and 7 illustrate the oscillating system of Fig. 5 on an enlarged scale.

The oscillating system of Fig. 5 is illustrated on an enlarged scale in Figs. 6 and 7. K is the loudspeaker coil traversed by alternating current. The oscillating core of this coil is connected with one end of an arm N. At the other end of the arm N is the testing coil C. M is a horseshoe magnet between the poles of which the coil K is placed.

Figure 8:
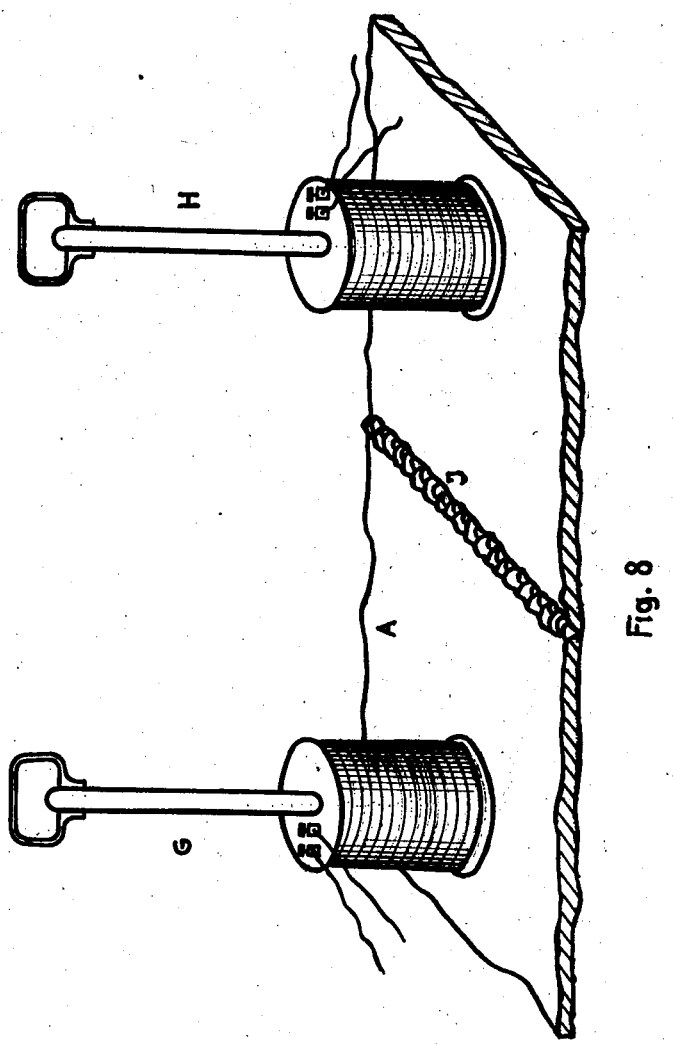
Fig. 8 shows an arrangement for magnetizing the workpiece with a minimum of disturbances to the testing device.

In Fig. 8 there is illustrated the exciting of the magnetic field, in order to avoid any disturbances. Two separate bar magnets G and H are placed upon the workpiece A which contains a joint or welded seam J. Only the lower parts of the relatively long bar magnets are within the magnet winding; the upper parts extend very far outwardly and are provided at their ends with iron handles. By means of this arrangement, the area surrounding the welded seam J to be tested is almost entirely free from the magnetic stray field of the poles in spite of the non-closed magnetic circuit. Because of the fact that the long ends of the bars extend upwardly, the stray field is brought to a higher position and, at the same time, the magnetic resistance is considerably reduced by their large surfaces, so that the magnetic flux in the workpiece still remains sufficiently great. The small remainder of the stray field can be rendered inoffensive by placing two testing coils C on the arm instead of only one. (Figs. 5, 6 and 7.) The two coils are placed directly one beside the other, so that they perform exactly the same oscillations, but they have to be electrically counter-connected. It is, of course, also possible to record the current induced in the coil C according to one of the known processes.

We claim:

1. An apparatus for discovering inhomogeneities in magnetizable workpieces which comprises at least one magnet for magnetizing the workpiece, an inductive coil to be placed in inductive relation to the workpiece, means for causing the inductive coil to oscillate and means of rendering perceptible the current produced in the inductive coil.

2. An apparatus for discovering inhomogeneities in magnetizable workpieces which comprises a magnet for magnetizing the workpiece, an inductive coil to be placed in inductive relation to the workpiece, an arm on which the inductive coil is placed, a coil traversed by alternating current and containing an iron core connected with the arm, and an earphone connected with the coil.

EUGEN SCHWEITZER.
SIEGFRIED KIESSKALT.